United States Patent [19]

Johnson et al.

[11] Patent Number: 4,976,977
[45] Date of Patent: Dec. 11, 1990

[54] PELLETING AGENT HAVING ENERGY VALUE

[75] Inventors: Mark S. Johnson, Wilmette; Edward Beaver, Palatine; Manojlo Jovanovic, Wheeling, all of Ill.; Domingo Chavez, Racine, Wis.

[73] Assignee: Oil-Dri Corporation of America, Chicago, Ill.

[21] Appl. No.: 335,735

[22] Filed: Apr. 10, 1989

[51] Int. Cl.$^5$ .......................... A23K 1/02; A23K 1/20; A23K 1/175

[52] U.S. Cl. ........................................ 426/96; 426/97; 426/453; 426/454; 426/285; 426/658

[58] Field of Search ...................... 426/96, 97, 74, 453, 426/454, 285, 658

[56] References Cited

U.S. PATENT DOCUMENTS

| | | | |
|---|---|---|---|
| 2,512,537 | 6/1950 | Zellers | 426/74 |
| 2,947,632 | 8/1960 | Kruse | 426/454 |
| 3,035,920 | 5/1962 | Knodt | 426/285 |
| 3,859,448 | 1/1975 | Hettrick | 426/285 |
| 4,171,386 | 10/1979 | Skoch | 426/658 |

FOREIGN PATENT DOCUMENTS 894722  3/1972  Canada ............................... 426/454

OTHER PUBLICATIONS

Babunidze, Pelleted Feed Mixtures with High Content of Fibre, Nutrition Abs & Rev., No. 12, pp. 24–25, 1984.

Primary Examiner—Jeanette Hunter
Attorney, Agent, or Firm—Dressler, Goldsmith, Shore, Sutker & Milnamow, Ltd.

[57] ABSTRACT

The present invention contemplates a particulate, free-flowing pelleting agent with energy value. The pelleting agent is constituted by discrete, free-flowing absorbent clay agglomerates that include clay and molasses in a clay-to-molasses weight ratio of at least about 1.5:1, respectively.

13 Claims, 3 Drawing Sheets

PELLETING AGENT HAVING ENERGY VALUE

TECHNICAL FIELD

This invention relates to a pelleting agent having energy value and to a method for producing such an agent. In particular, the present invention is directed to a particulate, clay-derived pelleting aid suitable for animal feed and containing molasses and to a method for its production.

BACKGROUND OF THE INVENTION

Animals such as livestock, poultry and pets obtain nutrition from various sources including forages, feed grains, protein supplements and the like. Rising costs for these sources and the desire to provide dietary elements these sources lack has led to the use of pelleted feeds.

Pelleted feeds are agglomerated feeds formed by extruding ingredients in a mechanical process. The purpose of pelleting is to take a finely divided, sometimes dusty, unpalatable and difficult-to-handle feed material and, by using heat, moisture and pressure, form it into larger particles. These larger particles are easy to handle, more palatable and are reported to result in improved feeding results when compared to the unpelleted feed. See, for example, *Pellet Mill Operators Manual*, American Feed Manufacturers Association, Arlington, VA, (1982), p. 3.

Pelleting also prevents the segregation of ingredients in a mixing, handling or feeding process. By consuming a pelleted feed, the animal is more apt to receive a homogenously mixed ration than when a non-pelleted feed that has separated into constituents through these processes is consumed.

Illustrative categories of animal feeds include high grain, heat sensitive, high natural protein, complete dairy and urea feeds. Typical high grain feeds include about 75 weight percent starchy grain products, about 15 to about 20 weight percent plant proteins, about 5 to about 10 weight percent crude fat and about 3 to about 5 weight percent crude fiber.

The manufacturing of feed pellets is an extrusion molding operation. Feed ingredients are made up of various constituents such as proteins, acids, sugars, fibers and minerals. These constituents are softened (conditioned) by combining them with steam which introduces heat and moisture. When controlled compression is applied to the "conditioned" feed ingredients in a pellet mill die chamber, they form a dense mass shaped to conform to the die through which they are pressed. When the heat and moisture are withdrawn by cooling and drying, the shaped mass in pellet form retains its shape and density, and has certain "toughness" or durability to withstand moderately rough handling without excessive breakage.

Steam conditioning also provides lubrication for the pelleting process so as to obtain a faster production rate, extend die life and reduce energy consumption. Furthermore, steam conditioning gelatinizes any starch present, thereby increasing the nutritional value of the feed.

Other desirable liquids such as molasses, sap, and fish solubles can be introduced into the steam line during the conditioning process to add nutritional value to the feed.

While molasses is a component in many animal feeds, the addition of molasses in cold mill processes creates many problems, including coating of the conveyor augers, overloading of conveyor motors, inadequate mixing with the other ingredients, and the like. On the other hand, molasses can be added at elevated temperatures into the steam line of the conditioner. However, even at elevated temperatures molasses is still a viscous liquid that can form lumps. It is also difficult to evenly distribute molasses throughout the other feed ingredients. Furthermore, a balance must be maintained between the steam and heated molasses to maintain the proper temperature and moisture content that produces tough pellets. Slight variations in the moisture content or temperature of the feed, steam or liquid molasses can cause poor pellets or loss of pelleting capability.

A binder can be added to the mixture if adequate pellet quality is not, or cannot be, obtained through proper steam conditioning and die selection. Two conventional binders are bentonite, a clay, and lignin sulfonate. However, binders such as clays do not provide energy value to the feed.

The present invention provides a pelleting agent having energy value while obviating the shortcomings of the aforementioned prior art pelleting compositions that seek to incorporate molasses into a pelleted feed.

SUMMARY OF THE INVENTION

The present invention contemplates a particulate, free-flowing pelleting agent with energy value and a method for producing the same. The pelleting agent comprises discrete, finely-divided absorbent clay agglomerates laced with molasses.

Clay is the major constituent of the pelleting agent. The agglomerates have a size of less than about 600 microns, and each agglomerate is constituted by a plurality of individual clay particles. Molasses is carried by the clay agglomerates and constitutes a minor constituent of the pelleting agent. The weight ratio of clay to molasses is at least about 1.5:1, respectively. However, sufficient molasses is present in the pelleting agent to provide the agglomerates.

Preferably, the clay is a member of the group consisting of bentonite, montmorillonite, smectite, hormite, kaolin, illite, haloysite, vermiculite, attapulgite, sepiolite, and the like. Mixtures of clays are also suitable.

The pelleting agent retains the physical characteristics of the clay and therefore, is a free-flowing substance that does not form lumps. Instead, it has a relatively low moisture content and can be evenly distributed when admixed with the feed ingredients without disturbing the desired moisture content of the feed ingredients. Thus, the present pelleting agent retains binding properties of the clay and provides energy value as well, while enhancing the durability of feed pellets formed therewith.

A method of producing the pelleting agent is also disclosed. In this method, molasses is pre-heated to reduce the viscosity of the molasses to no more than about 3000 centipoise. A particulate clay having a mean particle size of no more than about 250 microns is pre-heated. The molasses and clay are then combined in a clay-to-molasses weight ratio of at least about 1.5:1, respectively, with agitation. Free-flowing molasses-bearing clay agglomerates having a particle size of no more than about 600 microns are produced.

DESCRIPTION OF THE PREFERRED EMBODIMENTS

Although this invention is susceptible to embodiments in many different forms, preferred embodiments of the invention are shown. It should be understood, however, that the present disclosure is to be considered as an exemplification of the principles of the invention and is not intended to limit the invention to the embodiments illustrated.

In the present invention, a particulate, free-flowing pelleting agent having energy value comprises discrete absorbent clay agglomerates in which clay is a major constituent and molasses is a minor constituent.

The clay agglomerates have a size less than about 600 microns and are constituted by a plurality of clay particles held together, at least in part, by molasses.

The weight ratio of clay to molasses, on a solids basis, usually is at least about 1.5:1, respectively, and can be as high as about 10:1, depending upon the absorption capacity of the particular clay used.

In the present method of producing the pelleting agent, molasses is pre-heated to reduce the viscosity of the molasses to no more than about 3000 centipoise. A particulate clay having a mean particle size of no more than about 250 microns is pre-heated. The molasses and clay are then combined in a clay-to-molasses weight ratio of at least about 1.5:1, respectively, with agitation. Free-flowing molasses-bearing clay agglomerates having a particle size of no more than about 600 microns are produced.

The pelleting agent functions not only as a binder that enhances feed pellet durability but has energy value as well. An illustrative pelleting agent containing only clay and molasses in a weight ratio of clay to molasses of about 4:1, respectively, had a caloric (nutritional), or energy, value of about 0.4 megacals/kg, a significant contribution to the caloric value of pelleted feed.

The absorbent clay agglomerates useful in the present invention comprise as a major constituent a clay—a natural, earthy material composed primarily of hydrous aluminum silicates. Small amounts of non-clay materials can also be present. Illustrative suitable clays include bentonite, montmorillonite, smectite, hormite, kaolin, illite, halloysite, vermiculite, attapulgite, sepiolite and mixtures thereof.

Bentonites are composed primarily of montmorillonite, but can contain beidellite, fuller's earth, and similar minerals. Calcium bentonite can range in color from a cream, off-white to a dark reddish tan color. Preferred bentonite clays typically have bulk densities in the range of about 30 to about 40 pounds per cubic foot.

The clay agglomerates of the present invention are finely-divided and free-flowing. At least about 90 weight percent of the agglomerates pass through a 30 mesh U.S. Standard Sieve Series mesh screen. Thus, these clay agglomerates have a size of less than about 600 microns. Preferably, the mean agglomerate size is in the range of about 100 to about 350 microns.

The pelleting agent has a mean clay agglomerate size preferably in the range of about 110 to about 200 percent, more preferably about 115 to about 175 percent of the particle size of the clay particles utilized to make it. As a result, dusting tendency is reduced and flow properties of the pelleting agent are enhanced.

Clays suitable for manufacture of the clay agglomerates of the present invention preferably have a pH value in the range of about 4.6 to about 7. The pH value is determined from a 5 weight percent slurry of the clay in distilled water which is agitated for three minutes prior to measurement of the pH value by a conventional pH meter.

Molasses, a minor constituent of the present pelleting agent, are by-products of a manufacturing process such as the refining of raw cane sugar or is made from boiling down sweet vegetables or fruits. Illustrative molasses suitable for use herein include cane molasses, refiners' molasses, beet molasses, starch molasses, e.g., molasses from corn or grain sorghums, citrus molasses, hemicellulose extract and the like. These molasses contain varying amounts of different sugars, and therefore, different densities and weight percent of solids. Typical analyses of several types of molasses are presented in TABLE I.

TABLE I

| ANALYSIS OF ILLUSTRATIVE MOLASSES | | | | | |
|---|---|---|---|---|---|
| Property or Component | Cane Molasses | Beet Molasses | Citrus Molasses | Corn Molasses | Hemicellulose Extract |
| Standard Brix | 79.50 | 79.50 | 71.00 | 78.00 | 65.00 |
| Standard Baumé | 42.23 | 42.23 | 38.06 | 41.50 | 35.04 |
| Specific Gravity | 1.41 | 1.41 | 1.36 | 1.40 | 1.32 |
| Total Solids, % | 75.00 | 76.00 | 70.00 | 73.00 | 65.00 |
| Total Protein, % | 3.00 | 6.00 | 7.00 | 0.50 | 0.50 |
| Total Fat, % | 0.00 | 0.00 | 0.20 | 0.00 | 0.50 |
| Total Fiber, % | 0.00 | 0.00 | 0.00 | 0.00 | 0.50 |
| Nitrogen Free Extract, % | 63.00 | 62.00 | 55.00 | 60.00 | 55.00 |
| Ash, % | 8.50 | 9.00 | 6.00 | 9.00 | 4.50 |
| Calcium, % | 0.80 | 0.15 | 1.30 | 0.50 | 1.40 |
| Phosphorus, % | 0.08 | 0.02 | 0.15 | 0.05 | 0.05 |
| Potassium, % | 3.60 | 4.80 | 0.09 | — | — |
| Sodium, % | 0.20 | 1.10 | 0.27 | — | — |
| Chlorine, % | 1.60 | 1.20 | 0.07 | — | — |
| Sulfur, % | 0.30 | 0.50 | — | — | — |
| Soluble Gums | 3.00 | 3.50 | 3.50 | 0.00 | — |

TABLE I-continued
ANALYSIS OF ILLUSTRATIVE MOLASSES

| Property or Component | Cane Molasses | Beet Molasses | Citrus Molasses | Corn Molasses | Hemicellulose Extract |
| --- | --- | --- | --- | --- | --- |
| (Xylan, Araban, Pectin), % | | | | | |
| Lactic Acid, % | 1.50 | 0.20 | 0.15 | 0.50 | — |
| Vitamins (mg. per pound) | | | | | |
| Riboflavin | 1.50 | 1.00 | 2.80 | — | — |
| Niacin | 16.00 | 19.00 | 12.00 | — | — |
| Pantothenic Acid | 17.00 | 2.00 | 5.50 | — | — |
| Choline | 400.00 | 400.00 | — | — | — |
| Total Digestible Nutrients, wt % | 57 | 61 | 50 | 63 | 48 |
| Net Energy Value (Ruminants) Mcal/100 pounds | 72 | 72 | 64 | 72 | 72 |
| Productive Energy Value, Kcal/pound | 715 | 710 | — | — | — |
| Metabolizable Energy Value, Kcal/pound | 890 | 890 | — | — | — |

Cane molasses is preferred for the present purposes. Cane molasses is defined by the Association of American Feed Control Officials (AAFCO) as a by-product of the manufacture or refining of sucrose from sugar cane. To meet this definition it must not contain less than 46 percent total sugars, expressed as invert. Similarly, if its moisture content exceeds 27.0 percent, its density as determined by double dilution must not be less than 79.5° Brix.

The terms Brix and Baumé are both commonly used to indicate specific gravity, and both are equally acceptable for that purpose.

Molasses is so viscous that without dilution it is difficult to get an accurate hydrometer reading. Therefore, the AAFCO specifies a minimum standard of 39.75° Brix based on dilution with an equal amount of water. This is equivalent to a full strength Brix of 79.5° which is equal to 42.23 Baumé. Either reading indicates that the molasses has a true specific gravity of 1.41089 and a weight per gallon of 11.745 pounds. Molasses can and does entrain air during pumping and handling, so it is not unusual for volumetric measurements to be as much as 5 percent off.

At ambient temperatures, i.e., a temperature in the range of about 50° to about 80° F., molasses is a very viscous substance, i.e., it has a viscosity of about 9,600 centipoises (cp) at 70° F. and about 4,500 cp at 80° F. However, by elevating its temperature its viscosity is sharply decreased. Thus, warm molasses is easier to pump and is sorbed more quickly by the clay particles. Accordingly, it is preferred to admix warm molasses with clay particles to form the present clay agglomerates. The temperature of the molasses is preferably elevated to obtain a viscosity of no more than about 4,500 cp, more preferably about 4,500 to about 3,000 cp, at admixing. This temperature will vary dependant upon the molasses utilized.

The temperature to which the molasses is heated is sufficient to reduce the viscosity as desired but is below the temperature that causes degradation, e.g., carmelization or charring, of the molasses. The carmelization temperature for many types of molasses is about 115° F.. However, it is also possible to heat molasses to a temperature of about 150° F. to about 200° F. for a short time period without degradation. In preferred practice, heating above about 100° F. is to be avoided, however.

The sorbent clay particles are also preferably heated to an elevated temperature prior to combining with the molasses. This elevated temperature also preferably is not so high as to cause substantial degradation of the molasses during processing. A most preferred elevated temperature is no more than about 100° F.

Elevating the temperature of both the molasses and the clay particles improves sorption of the molasses by the clay particles and attendant agglomeration of the latter by maintaining a reduced viscosity during mixing and by obviating cooling of the molasses as it is absorbed and/or adsorbed by the individual clay particles. The elevated temperature is preferably maintained during the mixing process to further enhance distribution of the molasses in the clay.

Molasses and clay particles can be combined by spraying the molasses onto a bed of agitated, and preferably warm, clay particles until the desired loading, and a substantially uniform distribution, of molasses is achieved. The resulting agglomerate product is then cooled to ambient temperature, yielding a pelleting aid or agent that is in particulate form, free-flowing and has a moisture content of about 8 to about 10 percent by weight of the pelleting aid or agent. A conventional blender such as a V-cone blender, a ribbon blender, and the like, can be utilized for the desired agitation during manufacture.

The weight ratio of clay to molasses is at least about 1.5:1, respectively, as previously noted. A larger amount of molasses causes undesirable lumping of the pelleting agent and also adversely affects its flowability. Preferably this weight ratio of clay to molasses is about 1.5:1 to about 10:1, respectively.

The pelleting agent of the present invention can contain other optional constituents such as anti-caking agents, nitrogen sources such as urea, and the like. Edible surfactants such as mono- and diglycerides of fatty acids, e.g., glycerol monooleate, can also be utilized to facilitate penetration of the molasses into the absorbent clay particles that constitute the present agglomerates. Admixing urea with the molasses provides a non-protein nitrogen source and also lowers the viscosity of the molasses.

These optional constituents, when present, can comprise up to about 5 weight percent, preferably about 1 to about 3 weight percent, of the pelleting agent.

The pelleting agent in use is combined with conventional animal feed formulas. Because the pelleting agent is free-flowing, powdery and has a relatively low moisture content, it is readily homogeneously distributed in the animal feed without clumping, without coating equipment, without causing motor overloads, without creating molasses balls, etc.

The combined pelleting agent and animal feed admixture is then pelletized in a conventional manner as described in Pellet Mill Operators Manual, supra, pp 7–16. The use of the present pelleting agent minimizes the variation of moisture added to the animal feed by the clay and molasses which, in turn, facilitates control of the moisture content during pelleting. Control of the moisture content is important in the production of good, tough pellets as previously noted.

The pelleting temperature, i.e., the conditioning temperature, is dependent primarily upon the nature of the animal feed which is to be pelletized, but can vary over a relatively wide range. For heat-sensitive feeds the pelleting temperature can be as low as about 140° F. and lower. For high grain feeds the pelleting temperature must be at least about 180° F. with a conventional binder, whereas using the pelleting agent of the present invention the pelleting temperature can be lower.

The pelleted animal feed can be medicated, or nonmedicated, provided the pelleting agent does not interfere with analysis of the drug by acceptable methods.

The toughness of the pellets is measured using the Pellet Durability Index (PDI). This is done by using the so-called Kansas State University tumbling can. This particular method is described by McEllhiney, Feed Management 39(6):37 (June 1988). In this method, the pellets are screened to remove fines and then cooled at about room temperature for a time period of about 2 hours prior to measuring the PDI. A 500 gram sample is introduced into the tumbling can. Tumbling is maintained at 50 revolutions per minute (rpm) for a time period of 10 minutes. The tumbled sample is then removed from the tumbling can, screened to remove fines and weighed (in grams). The weight of the tumbled sample is divided by 500 grams (the weight of the sample initially) and then multiplied by 100 to obtain the PDI as a percent.

EXAMPLE I

PDI Comparison of Clay Particles and Pelleting Agent at Different Conditioning Temperatures The PDI was determined for pellets produced from a conventional animal feed without a binder that served as a control, designated as "none" in TABLE II, below, and admixtures of this animal feed with a binder of either clay particles alone or clay agglomerates of the present pelleting agent having a clay to molasses weight ratio of about 4:1, respectively. In each case about 2 weight percent of the clay particles or the pelleting agent were added.

The animal feed and the admixtures of animal feed and clay particles or pelleting agent were adjusted to a 12 weight percent moisture content and a temperature of 65° F. before being fed into a conventional steam conditioner. Steam was introduced into the conditioner to raise the moisture content of the feed or admixtures to about 16 to 17 weight percent. The temperature of the feed or admixtures was also thereby raised to either about 180° F. or about 200° F. As a general rule, for each one weight percent moisture added in the form of steam, the temperature of the composition is increased about 20° F.

Thereafter, the conditioned composition was pelletted in a pellet mill at a rate of about 106 pounds/hour.

The conventional animal feed utilized was a high grain formula commercially available from Centrol Soya Co., Madison, Wis. under the trade designation "Master Mix Diet #1 (8051)". This feed contained at least 16 weight percent protein, 8 weight percent fat and 4.5 weight percent fiber.

The clay utilized is commercially available from Oil-Dri Corporation of America, Chicago, Ill. under the trade designation RVM-MS Pel-Unite TM, an absorbent RVM-grade calcium bentonite clay.

The molasses utilized is a condensed liquid molasses commercially available from Kane Molass Laboratories, Inc., Mount Pulaski, Ill. under the trade designation "Kane Molasses".

Figure 2:
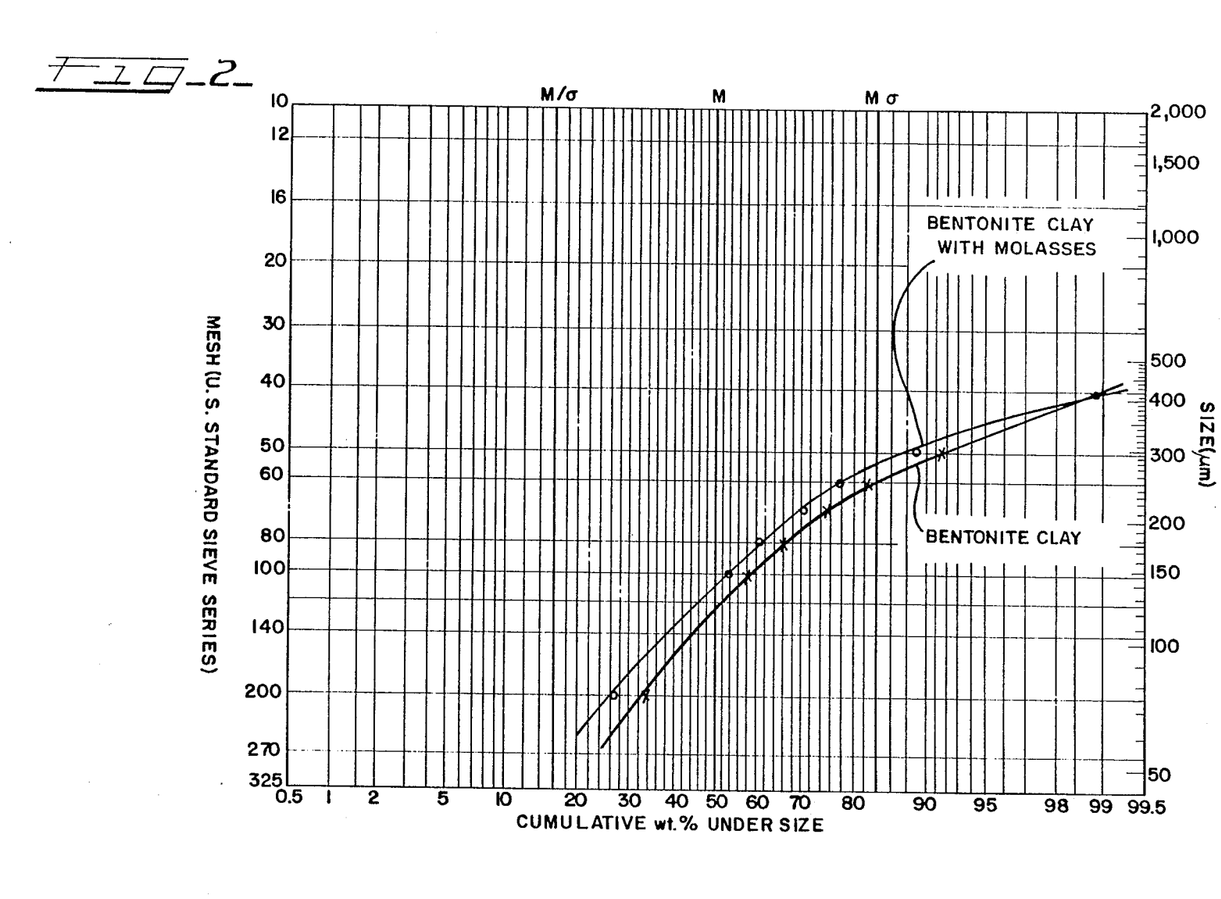
FIG. 2 is a graphical representation of particle size as a function of cumulative weight percent under that size for absorbent RVM-grade bentonite clay particles and of a pelleting agent utilizing the absorbent RVM-grade bentonite clay particles.

The particle size distributions of the clay particles and the pelleting agent are presented in FIG. 2.

TABLE II, below, shows that the PDI of pellets made with the pelleting agent of this invention was superior to the PDI of pellets that did not utilize a binder regardless of the conditioning temperature.

As also shown in TABLE II, at a conditioning temperature of 180° F. clay particles alone provided a PDI substantially the same as that provided by the present pelleting agent, albeit without a contribution to the energy value of the feed. On the other hand, when conditioning of the admixture was conducted at 200° F., the pelleting agent of the present invention increased the PDI of the produced pellets.

TABLE II

PDI STUDY

| Binder | Conditioner Temp. (°F.) | Steam Pressure (PSIG) Regulated[1] | Steam Pressure (PSIG) Boiler[2] | Steam Temp. (°F.) | Current (Amp.[3]) | Individual PDI (%) First | Individual PDI (%) Second | Ave. PDI (%) | Pellet Moisture Analysis Moisture content (%) | Pellet Moisture Analysis Moisture gain in conditioner (%) |
|---|---|---|---|---|---|---|---|---|---|---|
| None | 180 | 18 | 40 | 247 | 4.8 | 91.56 | 91.40 | 91.5 | 16.3 | 4.3 |
| None | 200 | 16 | 38 | 242 | 4.8 | 95.76 | 95.68 | 95.7 | 17.7 | 5.7 |
| Pelleting agent | 180 | 19 | 40 | 248 | 4.8 | 94.48 | 94.80 | 94.6 | 16.8 | 4.8 |
| Pelleting agent | 200 | 14 | 30 | 242 | 4.8 | 96.40 | 96.12 | 96.3 | 17.4 | 5.4 |
| Clay | 181 | 19 | 40 | 247 | 4.7 | 94.76 | 94.88 | 94.8 | 16.7 | 4.7 |
| Clay | 200 | 14 | 32 | 244 | 4.7 | 95.92 | 95.88 | 95.9 | 17.7 | 5.7 |

[1]Steam pressure at the conditioner.
[2]Steam pressure at the boiler.
[3]Amp. indicates current to the pellet mill.

EXAMPLE II

PDI Comparison of Various Clay Particles and Pelleting Agents

The average PDI was determined for pellets produced from the high grain animal feed of EXAMPLE I, that served as a control, and admixtures of the animal feed with a binder of either 2 weight percent clay particles or 2 weight percent of the present pelleting agent having a clay particles to molasses weight ratio of about 4:1, respectively.

Three types of clay were compared:

RVM-GW, an absorbent RVM-grade attapulgite clay from Georgia containing volatile matter and commercially available from Oil-Dri Corporation of America, Chicago, Ill.;

RVM-MS Pel-Unite TM, an absorbent RVM-grade calcium bentonite clay from Mississippi containing volatile matter and commercially available from Oil-Dri Corporation of America, Chicago, Ill.; and RVM-GA gelling-grade attapulgite clay from Georgia, commercially available from Oil-Dri Corporation of America, Chicago, Ill..

The molasses of EXAMPLE I was utilized.

Figure 1:
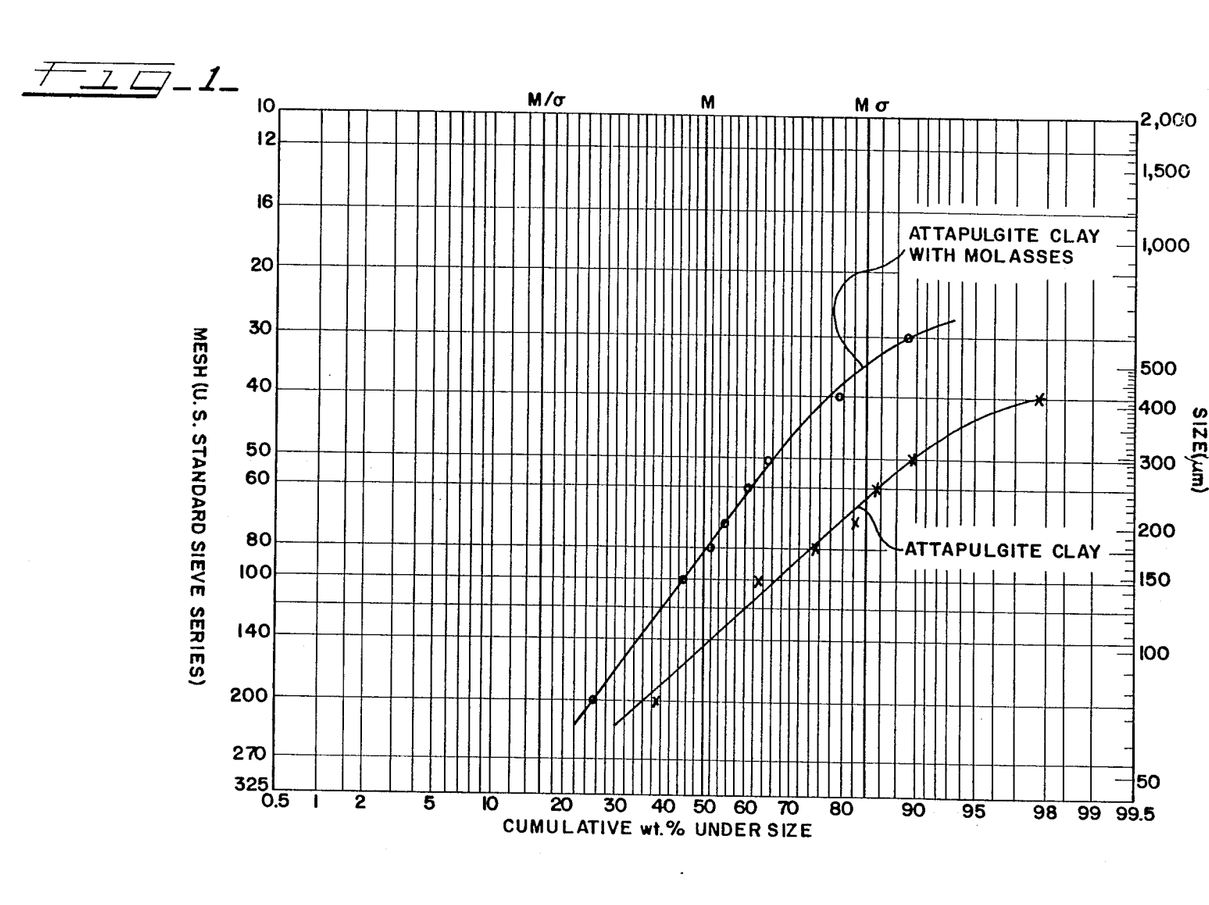
FIG. 1 is a graphical representation of particle size as a function of cumulative weight percent under that size for absorbent, regular volatile matter (RVM) grade attapulgite clay particles and of a pelleting agent utilizing the RVM-grade attapulgite clay particles.
Figure 3:
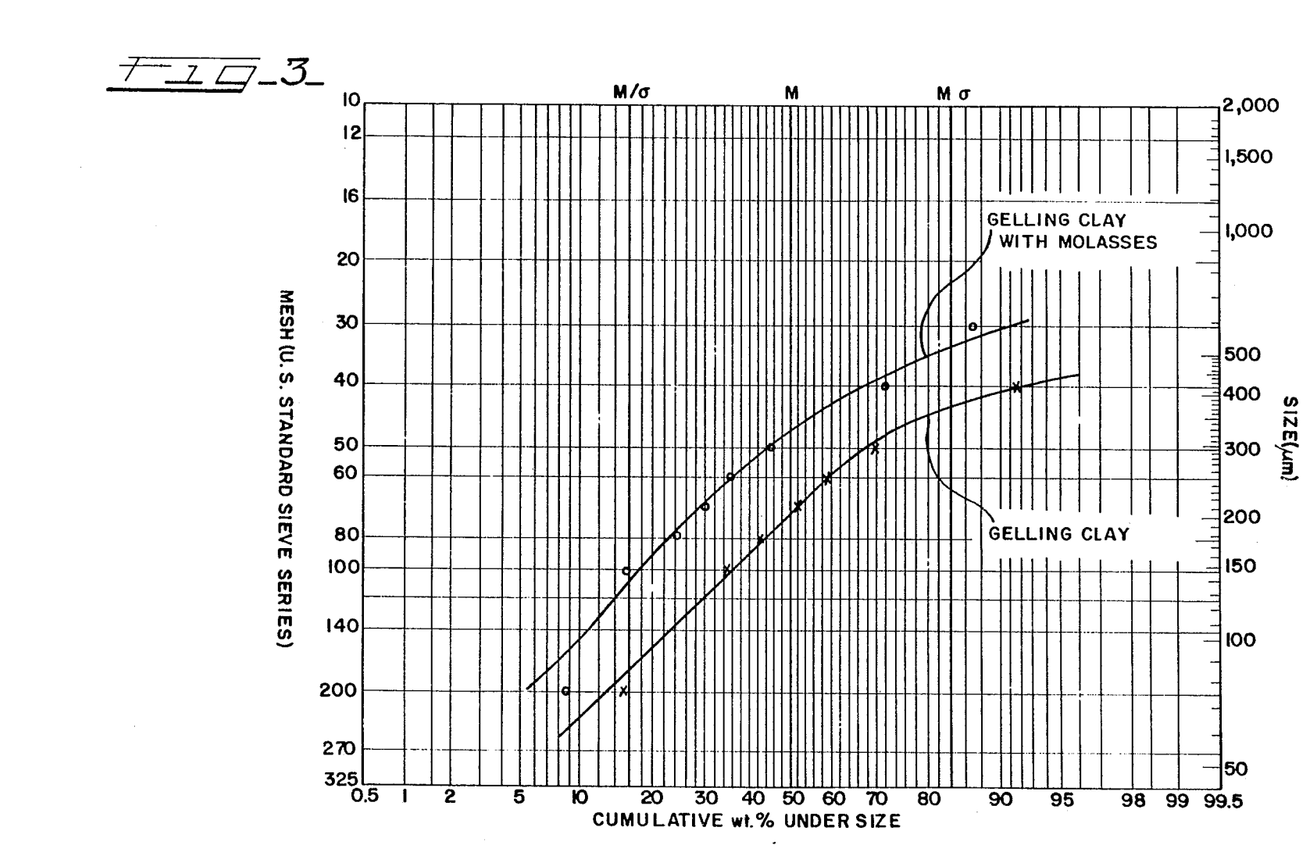
FIG. 3 is a graphical representation of particle size as a function of cumulative weight percent under that size for gelling-grade attapulgite clay particles and of a pelleting agent utilizing the gelling-grade attapulgite clay particles.

The particle size distribution of the clay and the pelleting agent for the RVM-GW clay, the RVM-MS Pel-Unite TM clay and the RVM-GA gelling-clay, and pelleting agents produced therefrom, are shown in FIGS. 1, 2 and 3, respectively.

The animal feed and the admixtures of animal feed and clay particles or pelleting agent were adjusted to a 12 weight percent moisture content and a temperature of 65° F. before being fed into a conventional conditioner. Steam was introduced into the conditioner to raise the moisture content and the temperature of the feed or admixtures thereof with the pelleting agent to about 16 weight percent and 181° F., respectively. Thereafter, the conditioned composition was pelletted in conventional manner at a rate of about 106 pounds/hour.

The results of the average PDI for four PDI tests (based on two sample runs) are presented in TABLE III, below. These results show that for all three types of clay particles, pellets made utilizing the present pelleting agent exhibited an increase in PDI as compared to pellets that did not utilize a binder or those that utilized only clay particles as a binder.

TABLE III

EFFECT OF VARIOUS CLAYS ON PDI

| Binder | AVE. PDI (%) |
|---|---|
| None | 84.5 |
| RVM-MS Pel-Unite TM clay | 87.6 |
| RVM-MS Pel-Unite TM clay w/molasses | 95.3 |
| RVM-GW clay | 83.4 |
| RVM-GW clay w/molasses | 95.4 |
| RVM-GA gelling clay | 88.9 |
| RVM-GA gelling clay w/molasses | 89.1 |

EXAMPLE III

Analysis of Properties of Clay Particles and Pelleting Agents

The properties of three types of clay particles and pelleting agents made therefrom were analyzed and are presented in TABLE IV, below.

The clays of EXAMPLE II were utilized.

The pelleting agents were made utilizing the molasses described in EXAMPLE I.

The weight ratio of clay particles to molasses in the pelleting agents was about 4:1, respectively.

The processing conditions utilized were as follows. Heated molasses [about 32° C. (90° F.); about 80 wt.-% solids] was gradually added to a premeasured amount of clay in a mixing bowl and agitated using a variable speed mixer. Substantially lump-free product was recovered and tested.

Density of the product was determined using the Ohaus Loose Bulk Density determination method.

The free water, as a percent, is determined by weighing a sample to obtain an initial weight, heating the sample in a laboratory oven at a temperature of 105° C. for a time period of two hours and weighing the heated sample. The weight of the heated sample is divided by the initial weight of the sample and then multiplying by 100 to obtain the free water expressed as a percent.

TABLE IV

ANALYSIS OF PROPERTIES

| Property | Clay particles | | | Pelleting Agent[1] | | |
|---|---|---|---|---|---|---|
| | GW[2] | MS[3] | GA[4] | GW[2] | MS[3] | GA[4] |
| Density, (lb./cu. ft) | 28.3 | 36.7 | 35.7 | 36.1 | 42.5 | 46.1 |
| Free Water, (%) | 7.2 | 5.5 | 2.5 | 8.3 | 8.7 | 9.5 |
| Water Absorption, (ml/g)[5] | 2.5 | 1.8 | 3.2 | 1.9 | 1.6 | 2.5 |
| pH value | 6.75 | 4.81 | 8.75 | 6.1 | 5.26 | 6.88 |

| Sieve size (U.S. Sieve Series mesh)[6] | Sieve Analysis (wt %)[6] | | | | | |
|---|---|---|---|---|---|---|
| +30 | 0 | 0.1 | 0 | 11.1 | 0 | 13.6 |
| +40 | 2.1 | 0.3 | 7.1 | 9.2 | 1.1 | 15.0 |
| +50 | 8.4 | 6.3 | 23.8 | 14.1 | 10.2 | 26.4 |
| +60 | 4.2 | 11.2 | 10.9 | 5.2 | 11.7 | 9.9 |
| +70 | 3.2 | 6.9 | 7.5 | 2.8 | 6.9 | 4.8 |
| +80 | 6.9 | 9.5 | 8.2 | 5.7 | 9.8 | 6.1 |
| +100 | 9.5 | 8.6 | 7.1 | 7.3 | 8.8 | 4.8 |
| +200 | 27.3 | 24.4 | 19.6 | 19.4 | 24.2 | 10.7 |
| −200 | 38.4 | 32.6 | 15.8 | 25.2 | 27.3 | 8.8 |

[1]Contained the enumerated clay and molasses in a weight ratio of 4:1, respectively.
[2]RVM-GW, an absorbent RVM-grade attapulgite clay.
[3]RVM-MS Pel-Unite TM, an absorbent RVM-grade calcium bentonite clay.
[4]RVM-GA, a gelling-grade attapulgite clay.
[5]Water Absorption as determined by General Services Administration (GSA) specification P-A-1056 B of February 24, 1976 for absorption of oil and water by floors and decks.
[6]The weight percent of the clay particles or pelleting agent that is retained by the indicated U.S. Sieve Series mesh, wherein "+" indicates the weight percent of particles greater in size than that mesh and "−" indicates the weight percent of particles smaller in size than that mesh.

The particle size distribution of the clay particles and pelleting agent of TABLE IV are graphically represented in FIGS. 1–3 on Promesh TM graph paper. The mesh, in U.S. Sieve Series, and the size, in microns, are units of measure on the ordinate and the cumulative weight percent under size is the unit of measure on the abscissa To produce these Figures, the raw data presented in TABLE IV under Sieve Size and Analysis is converted to cumulative percentages, e.g., under clay particles, GW, and Sieve size+40 the screen analysis raw data is 2.1% which is subtracted from 100% to obtain a cumulative percentage of 97.9%. The cumulative percentage vs. sieve size is then plotted.

These Figures illustrate the increased size of the pelleting agent agglomerates as compared to the clay particles alone.

EXAMPLE IV

PDI Comparison for Various Pellets Produced at Different Conditioning Temperatures The PDI was determined for pellets produced from a conventional animal feed without a binder that served as a control and admixtures of this animal feed with a binder of either clay particles or clay agglomerates of the present pelleting agent having a clay to molasses weight ratio of about 4:1, respectively. Either about 2 weight percent of clay particles or pelleting agent were added to the animal feed.

The animal feed and molasses of EXAMPLE I were utilized.

A calcium bentonite clay commercially available under the designation Pelbon ™, from American Colloid Co., Arlington Heights, Ill. was utilized.

The particle size distribution of the clay is presented in TABLE V.

TABLE V

PARTICLE SIZE DISTRIBUTION FOR A CALCIUM BENTONITE CLAY[1]

| Sieve size (U.S. Sieve Series mesh)[2] | Sieve Analysis (wt %)[2] |
|---|---|
| +30 | 0.3 |
| +40 | 0.6 |
| +50 | 1.7 |
| +60 | 1.2 |
| +70 | 0.9 |
| +80 | 1.9 |
| +100 | 2.3 |
| +200 | 17.2 |
| +325 | 20.1 |
| −325 | 53.8 |

[1] Pelbon ™, commercially available from American Colloid Co., Arlington Heights, Illinois.
[2] The weight percent of the clay particles that is retained by the indicated U.S. Sieve Series mesh, wherein "+" indicates the weight percent of particles greater in size than that mesh and "−" indicates the weight percent of particles smaller in size than that mesh.

The feed, feed and clay admixture or feed and pelleting agent admixture each were adjusted to a moisture content of about 12 weight percent before being fed into a conventional steam conditioner for pelletizing as described hereinbefore.

The conditioning temperature was either 180° F. or 170° F. with a moisture content of about 16 or about 15 weight percent, respectively.

The feeder setting was the same for all pelleting runs. That is, a feeder setting was utilized which corresponds to a production rate of about 106 pounds/hour.

The results of the average PDI for four PDI tests (two tests for each of two sample runs) are presented in TABLE VI, below. These results show that the PDI of the pellets produced at 180° F. and utilizing a clay or pelleting agent exhibit an increase in PDI. However, in all instances the pellets that utilize the pelleting agent of the present invention have a higher energy value than the pellets that utilized clay alone. This higher energy value is desirable, as previously discussed.

The foregoing data also show that at a relatively lower pelleting temperatures of 170° F., the presence of molasses in the clay-based pelleting agent enhances the Pellet Durability Index.

TABLE VI

EFFECT OF CONDITIONING TEMPERATURE ON PDI

| Binder | Conditioning Temp. (°F.) | AVE. PDI (%) |
|---|---|---|
| None | 180 | 94.8 |
| Calcium bentonite | 180 | 95.3 |
| Calcium bentonite w/molasses | 180 | 95.1 |
| None | 170 | 93.1 |
| Calcium bentonite | 170 | 92.2 |
| Calcium bentonite w/molasses | 170 | 93.1 |

EXAMPLE V

PDI Comparison of Pellets Produced From a Control, Calcium Bentonite Clay, Sodium Bentonite Clay and Pelleting Agents The PDI was determined for pellets produced from a conventional animal feed without a binder that served as a control and admixtures of this animal feed with a binder of either 2 weight percent clay particles or 2 weight percent clay agglomerates in the form of the present pelleting agent.

The animal feed and molasses of EXAMPLE I were utilized.

The clays utilized were RVM-MS Pel-Unite ™, an absorbent RVM-grade calcium bentonite clay, commercially available from Oil-Dri Corporation of America, Chicago, Ill. and a conventional sodium bentonite clay.

Pelleting agent produced using the RVM-MS Pel-Unite ™ clay had a clay-to-molasses weight ratio of about 4:1, respectively. The particle size distributions of this clay and pelleting agent produced therefrom are presented in FIG. 2.

Pelleting agent produced using the sodium bentonite clay had a clay-to-molasses weight ratio of about 9:1, respectively. The particle size distribution of this clay is presented in TABLE VII.

TABLE VII

PARTICLE SIZE DISTRIBUTION FOR A SODIUM BENTONITE CLAY[1]

| Sieve size (U.S. Sieve Series mesh)[1] | Sieve Analysis (wt %)[1] |
|---|---|
| +30 | 0.3 |
| +40 | 0.5 |
| +50 | 23.3 |
| +60 | 12.4 |
| +70 | 6.2 |
| +80 | 9.6 |
| +100 | 9.1 |
| +200 | 27.9 |
| +325 | 7.6 |
| −325 | 3.0 |

[1] The weight percent of the clay particles that is retained by the indicated U.S. Sieve Series mesh, wherein "+" indicates the weight percent of particles greater in size than that mesh and "−" indicates the weight percent of particles smaller in size than that mesh.

The conditioning temperature was 180° F. with a moisture of the feed adjusted to about 12 weight percent before conditioning. Pelleting was performed as described hereinbefore.

The production rate for all pelleting runs was about 106 pounds/hour.

The results of the average of two PDI tests are presented in TABLE VIII, below. These results indicate that the RVM-MS containing pellets have a greater PDI as compared to both the control and the sodium bentonite containing pellets.

from the present pelleting agent at a given clay-to-molasses ratio.

TABLE IX
COMPARISON OF AVERAGE PDI FOR PELLETS PRODUCED WITH VARIOUS BINDERS

| Binder | Wt-percent Binder | Clay-to-molasses weight ratio | Conditioning Temp. (°F.) | Average PDI (%) | N[1] |
|---|---|---|---|---|---|
| None | 0 | NA[2] | 177 | 92.0 | 6 |
| RVM-MS Pel-Unite TM | 2 | NA | 177 | 94.0 | 4 |
| RVM-MS Pel-Unite TM w/molasses | 2 | 4:1 | 177 | 94.0 | 4 |
| RVM-MS Pel-Unite TM w/molasses | 4 | 1.6:1 | 177 | 94.1 | 4 |
| None | 0 | NA | 190 | 94.2 | 2 |
| RVM-MS Pel-Unite TM w/molasses | 4 | 1.6:1 | 190 | 95.5 | 2 |

[1] Number of tests conducted to determine average PDI. Two tests were conducted on each sample produced.
[2] Not applicable.

TABLE VIII
COMPARISON OF CALCIUM BENTONITE AND SODIUM BENTONITE AT A CONDITIONING TEMPERATURE OF 180° F.

| Binder | AVE. PDI (%) |
|---|---|
| None | 94.4 |
| RVM-MS Pel-Unite TM clay | 95.6 |
| RVM-MS Pel-Unite TM clay w/molasses | 95.6 |
| Sodium bentonite clay | 94.9 |
| Sodium bentonite clay w/molasses | 95.1 |

EXAMPLE VI
PDI Comparison of Pellets Produced From a Control, Clay Particles and Pelleting Agents at Various Conditions The average PDI was determined for pellets produced from the animal feed of EXAMPLE I, that served as a control (denoted as "None" in TABLE IX, below) and admixtures of the animal feed with a binder of either clay particles or the present pelleting agent.

Pellets were produced at conditioning temperatures of 177° F. and 190° F.

The clay utilized was RVM-MS Pel-Unite TM, an absorbent RVM-grade calcium bentonite clay commercially available from Oil-Dri Corporation of America, Chicago, Ill.

The molasses of EXAMPLE I was utilized.

The particle size distribution of the clay particles and the pelleting agent having a clay-to-molasses weight ratio of 4:1, respectively, are presented in FIG. 2.

Conditioning was performed as described hereinbefore.

The conditioned composition was pelletted in a pellet mill at a rate of about 160 pounds/hour.

The weight-percent binder, clay-to-molasses weight ratio, conditioning temperature and average PDI for pellets produced are provided in TABLE IX, below.

The results indicate that increasing the conditioning temperature increases the PDI for pellets produced from the present pelleting agent at a given clay-to-molasses ratio.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure as those skilled in the art will appreciate.

We claim:

1. A particulate, free-flowing pelleting agent having energy value and comprising discrete, absorbent clay agglomerates having clay as a major constituent thereof and molasses as a minor constituent thereof; the clay agglomerates having a size less than about 600 microns and the weight ratio of clay particles to molasses being at least about 1.5:1, respectively.

2. The pelleting agent in accordance with claim 1 wherein the mean size of the clay agglomerates is in the range of about 100 to about 350 microns.

3. The pelleting agent in accordance with claim 1 wherein the weight ratio of clay to molasses is in the range of about 1.5:1 to about 10:1, respectively.

4. The pelleting agent in accordance with claim 1 wherein the clay is a member of the group consisting of bentonite, montmorillonite, smectite, hormite, kaolin, illite, halloysite, vermiculite, attapulgite, sepiolite, and mixtures thereof.

5. The pelleting agent in accordance with claim 4 wherein the clay is a bentonite.

6. The pelleting agent in accordance with claim 4 wherein the clay is an attapulgite.

7. An animal feed supplement in pellet form including the pelleting agent defined by claim 1.

8. A particulate, free-flowing pelleting agent having energy value and comprising discrete, absorbent clay agglomerates having clay as the major constituent thereof and molasses as the minor constituent thereof, the clay agglomerates having a mean size in the range of about 100 to about 350 microns; the clay being a member of the group consisting of bentonite, montomorillonite, smectite, hormite, kaolin, illite, halloysite, attapulgite, sepiolite and mixtures thereof, and the weight ratio of clay to molasses being in the range of about 1.5:1 to about 10:1, respectively.

9. A method for producing a particulate, free-flowing pelleting agent having energy value and comprising:

pre-heating molasses to a temperature sufficient to reduce the viscosity of the molasses to no more than about 4,500 centipoises;

pre-heating particulate clay having a mean particulate size of no more than about 250 microns to a temperature of no more than the degradation temperature of said molasses; and combining the pre-heated clay and the pre-heated molasses in a clay-to-molasses weight ratio of at least about 1.5:1, respectively, with agitation, so as to produce free-flowing, molasses-bearing clay agglomerates having a particle size of no more than about 600 microns.

10. The method in accordance with claim 9 wherein the clay is heated to a temperature of no more than about 100° F.

11. The method in accordance with claim 9 wherein the clay-to-molasses weight ratio is about 1.5:1 to about 10:1, respectively.

12. The method in accordance with claim 9 wherein the clay-to-molasses weight ratio is about 4:1, respectively.

13. The method in accordance with claim 9 wherein the viscosity of the molasses is about 4,500 to about 3,000 centipoise.

* * * * *